Dec. 12, 1950   W. H. SILVER ET AL   2,533,521
QUICK DETACHABLE HITCH

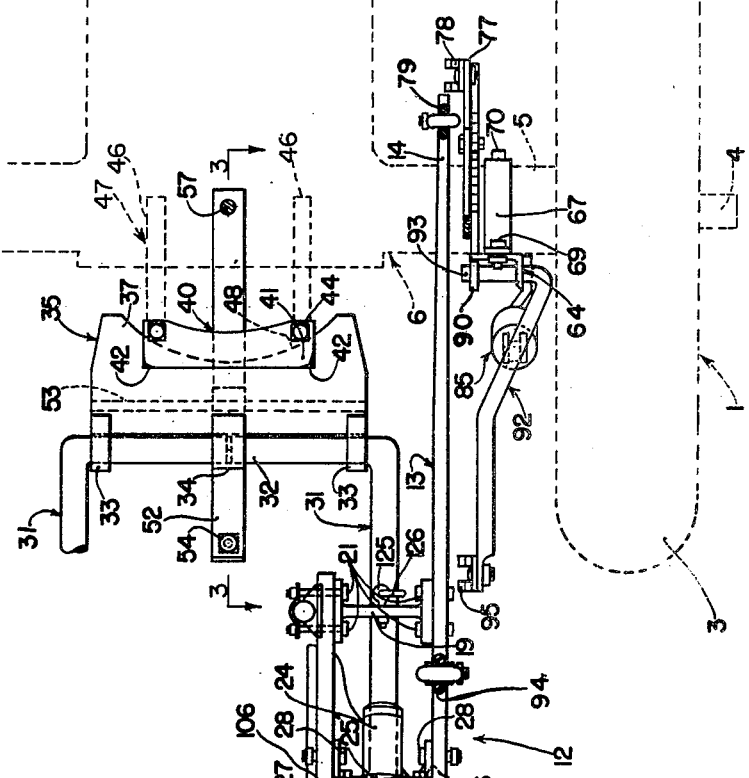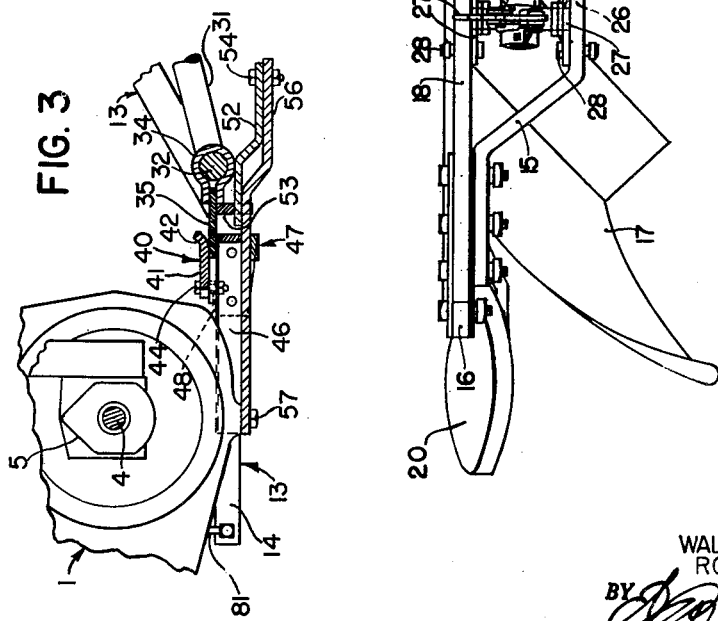

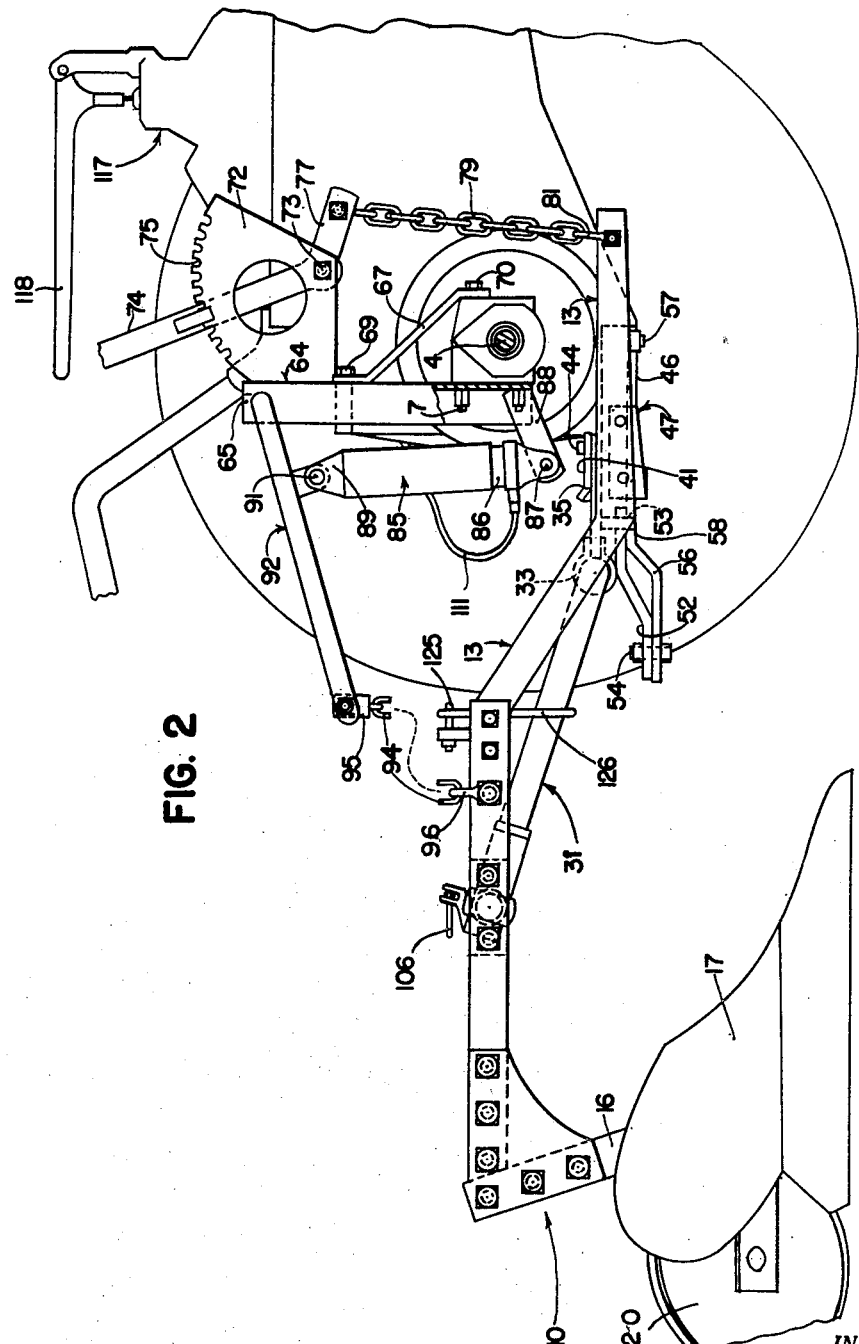

Original Filed Dec. 4, 1944   3 Sheets-Sheet 3

INVENTORS
WALTER H. SILVER
ROBERT E. COX
BY
ATTORNEYS

Patented Dec. 12, 1950

2,533,521

UNITED STATES PATENT OFFICE 2,533,521

QUICK DETACHABLE HITCH

Walter H. Silver and Robert E. Cox, Moline, Ill., assignors to Deere & Company, Moline, Ill., a corporation of Illinois Original application December 4, 1944, Serial No. 566,539. Divided and this application January 11, 1946, Serial No. 640,570

19 Claims. (Cl. 97—47)

This application is a division of our co-pending application, Serial No. 566,539, filed December 4, 1944.

The present invention relates generally to tractor mounted implements and is more particularly concerned with tractor mounted plows.

The object and general nature of the present invention is the provision of a tractor mounted implement which is particularly designed for quick and easy connection with and disconnection from the tractor. More particularly, it is a feature of this invention to provide an integral plow adapted to be connected with and disconnected from its supporting tractor merely by manipulating two or three parts, which may be done very quickly. Specifically, it is a feature of this invention to provide a tractor mounted plow which includes a hingedly connected draft member that is adapted to be entered into a socket member carried on the tractor by backing the tractor a small distance, and then inserting a hitch pin or pivot and connecting a depth control on the tractor with the front portion of the plow beam or frame. Further, it is a feature of this invention to provide a quick detachable connection for connecting an implement with a tractor, which connection accommodates any necessary or desirable lateral swinging of the implement relative to the tractor after the connection has been established.

These and other objects and advantages of the present invention will be apparent to those skilled in the art after a consideration of the following detailed description, taken in conjunction with the accompanying drawings in which the preferred form of the present invention has been illustrated.

In the drawings:

Figure 1 is a plan view of the present invention as embodied in a one-bottom two-way tractor mounted or integral plow.

Figure 2 is a side view of the construction shown in Figure 1.

Figure 3 is a sectional view taken along the line 3—3 of Figure 1.

Figures 4, 5:
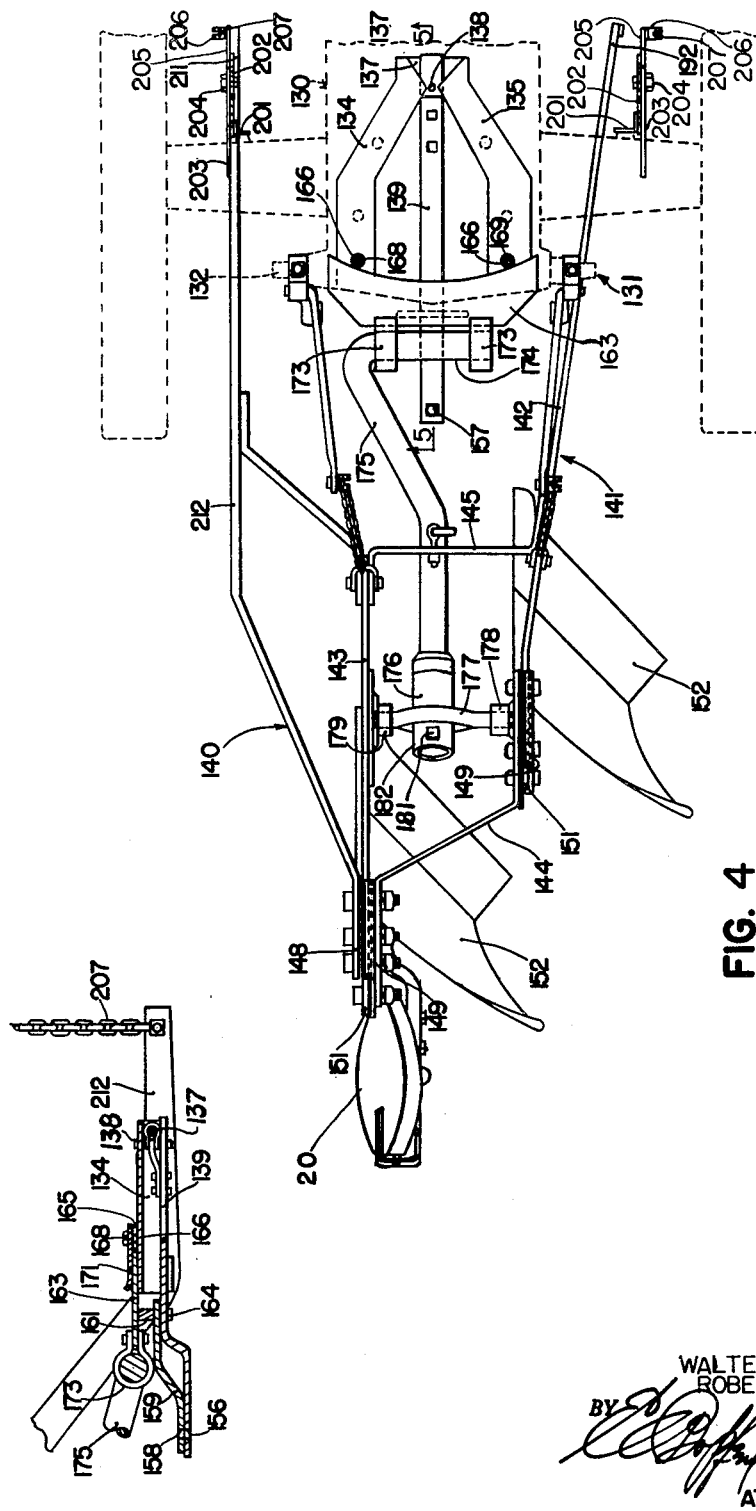
Figure 4 is a plan view of a modified form of the present invention.
Figure 5 is a sectional view taken along the line 5—5 of Figure 4.

Referring now to the drawings, more particularly to Figures 1 and 2, the tractor is indicated in its entirety by the reference numeral 1 and includes a pair of closely spaced front wheels and a pair of wide spaced rear traction wheels 3 mounted on axle shafts 4 that are carried in extensions 5 forming a part of the rear axle structure 6. The latter is secured to or forms a part of the frame of the tractor. Each of the rear axle housing extensions is provided with attaching studs or the like, indicated at 7, adapted to receive various implement parts as will be referred to below.

The quick detachable hitch construction shown in Figures 1 and 2 is adapted for use with a two-way plow which is indicated in its entirety by the reference numeral 10 and includes a right-hand unit 12 and a left-hand unit. Generally speaking, the right and left-hand units have identical parts except that some of them are right-hand while the others are left-hand, and therefore a detailed description of, for example, the right-hand unit will suffice.

The right-hand unit 12 includes a generally longitudinally extending beam 13 having a front end 14 extending forwardly underneath the tractor axle 6. At its rear end the beam 13 is bent laterally, as at 15 in Figure 1, and is joined by suitable means to a shank or standard 16 to which the plow bottom 17 is fixed in any suitable manner. A rolling landside 20 is fixed to the shank or standard 16 and cooperates with the depth adjusting the lifting means, as explained below. Forming a part of the beam 13 is a beam extension 18 which preferably is disposed in the plane of the shank or standard 16 and is secured thereto by the same bolts that fix the rear end of the beam 13 to the standard. The beam extension 18 extends forwardly and at its forward end is connected by a yoke 19 to the intermediate portion of the beam 13. The yoke 19 comprises an upwardly arched member secured, as by bolts 21, to the beam and beam extension. Rearwardly of the yoke 19, a longitudinally disposed sleeve or socket member 24 is fixed to a second yoke member 25 having trunnions 26 rotatably received in a pair of bearing brackets 27 bolted, as at 28, to the beam extension 18 and the beam 13. A colter (not shown) is mounted on the beam extension 18 adjacent the forward end thereof, preferably by the same bolts 21 that fix the laterally inner end of the yoke 19 to the beam extension 18.

Rotatably received in the socket or sleeve member 24 is a generally L-shaped rigid draft member 31 which, at its forward end, includes a laterally inwardly directed section 32. The laterally inwardly directed section 32 is rockably received in an outer right-hand encircling clip 33 and an intermediate encircling clip 34, both clips being secured, as by welding, to a generally horizontal flat hitch plate 35. The latter is provided with a left-hand U-shaped clip 33, and in the latter and the left half of the intermediate clip 34, the left-hand rigid draft member 31 is received. The flat hitch plate 35 extends laterally from the longitudinally extending portion of the rigid draft member at one side of the tractor to the corresponding portion of the draft member at the other side of the tractor, and has a centrally disposed arcuate section 37 which, when the plow is attached to the tractor, is received in a tractor-supported socket or recess member 40. This member comprises an upper plate 41 having its rear corners 42 bent upwardly to facilitate backing the tractor into position relative to the plate 35, the plate 41 being bolted, as at 44, to the two angles 46 making up the tractor drawbar support 47. Wear sleeves 48 are disposed about each bolt 44 to protect the latter from wear through contact with the forward arcuate edge 37 of the plate 35. Secured to the hitch plate 35 and forming a rearwardly extending part thereof is a rearward extension 52 connected to the plate 35 by a bracket 53 or the like, and the rear hitch plate extension 52 is provided with an opening to receive a hitch bolt 54. The bolt 54 also passes through the opening in the rear end of the laterally swinging tractor drawbar 56, a part that normally is carried by the tractor drawbar support 47 and pivots laterally about a vertical axis, as defined by a pivot connection 57. A notch in the center of the bracket 53 receives the tractor drawbar, as indicated in Figure 2 at 58. Thus, while the plate member 35 is connected by only a single bolt, as at 54, to the tractor drawbar 56, the plate 35 is constrained to swing with the tractor drawbar 56 about the axis 57.

At each side of the tractor a vertical angle or channel member 64 is fastened by the studs 7 to the rear axle housing extension. Each angle member 64 is reenforced by a brace 67 bolted, as at 69 and 70, to the brace and to the forward side of the rear axle housing. A sector 72 is secured, as by welding or the like, to each vertical angle member 65 and is apertured to receive a pivot bolt 73 by which a lever 74 is mounted thereon. The lever 74 carries the usual detent mechanism cooperating with notches 75 in the sector 72, whereby the lever 74 may be latched against movement in any one of a number of different positions. The lever 74 is extended forwardly at its lower end, as at 77, and carries a slotted clip 78 in which one of the links of a chain 79 may be engaged. The lower end of the chain 79 is connected by a clevis 81 to the forward end of the plow beam 13. By latching the lever 74 in different positions, the vertical position of the front end of the plow beam 13 may be determined.

The chain 79 is a flexible element and constitutes, in effect, a one-way connection between the depth adjusting lever 74 and the front end of the beam 13, limiting the downward movement of the front end of the beam but permitting the front end of the beam to move upwardly without affecting the position of the lever 74 and without being affected thereby.

Mounted on each of the angles 65 rearwardly thereof is a single acting ram or piston and cylinder unit 85. The cylinder 86 thereof is pivotally mounted, as at 87, on a bracket 88 fixed to the lower end of the angle 65, and the piston section 89 of the unit 85 is pivotally connected, as at 91, to a power lift arm 92 formed with a laterally inturned end 93 pivotally mounted in an opening formed in the rearwardly extending flange of the angle 65 and a bracket 90 welded to the upper end of the angle laterally inwardly of the flange thereof. The rear end of the lift arm 92 is connected by a chain 94 to the intermediate portion of the beam 13. Preferably, the chain 94 is connected to the arm 92 by a slotted clip 95 substantially the same as the slotted clip 78 mentioned above. Each plow may therefore be raised into inoperative position by extending the ram unit 85 associated therewith, and during such lifting action the first movement of the ram unit in the extending direction raises the front end of the associated plow beam 13 upwardly until it engages the bottom of the rear axle of the tractor. Thereafter, continued extension of the ram unit then lifts the rear end of the plow beam upwardly, the latter being raised about its point of contact with the rear axle of the tractor as a fulcrum.

Each plow may be adjusted for lateral tilt, or leveling, by means acting between the plow beam and the rigid draft transmitting member 31. The adjusting means employed here is substantially the same as that shown in the co-pending application, Serial No. 566,539, filed December 4, 1944, to which reference may be made if necessary. Briefly, an arm fixed rigidly to the rear end of the member 31 is connected with an arm carried by the yoke member 25 through the agency of a rotatable crank screw 106. Thus, by turning the crank screw 106, the position of the plow beam and plow bottom relative to the draft transmitting member 31 may be adjusted for the purpose of leveling the plow.

The hydraulic mechanism for actuating the ram units 85 is substantially like that shown in the U. S. patent to Walter H. Silver 2,383,689, issued August 28, 1945, to which reference may be made if necessary. Briefly, such hydraulic mechanism includes two hoses 111 leading, respectively, to the rams 85 and connected at their forward or upper ends to a two-way valve unit which is controlled by a hand lever or the like. The two-way valve unit is connected to or forms a part of a controlling valve mechanism 117 carried by the tractor. The mechanism of the controlling valve mechanism 117 is not shown in detail since this structure is disclosed and claimed in United States Patent No. 2,340,474, issued February 1, 1944, to Jay D. Johnson. Briefly, such controlling valve mechanism incorporates a valve handle 118 movable to three positions, namely, an upper position in which fluid under pressure is caused to be directed outwardly from the valve unit 117, a second position in which the fluid is blocked against returning to the sump or reservoir incorporated in or associated with the unit 117, and a third position in which a valve is opened to permit oil or other fluid to flow freely back to the unit 117. In the present construction, the two-way valve unit serves as a selecting valve placing one or the other of the ram units 85 in communication with the tractor valve unit 117 to be controlled by the latter while locking fluid in or preventing flow of fluid to the other ram unit, as will be explained in more detail when describing the operation of the implement.

Each of the yokes 19 carries an eyebolt 125 to which a hook 126 is connected. The hook 126 is preferably of spring steel or the like and is constructed and arranged to be engaged underneath the associated draft member 31 for supporting the same against falling to the ground when the tractor is disconnected from the implement. When in operation, the hook 126 may be swung upwardly out of the way and hooked behind some convenient part, such as the upper end of the shank of the colter.

The operation of the implement described above is substantially as follows.

Figure 2 shows the plow in operative connection with the tractor. When it is desired to disconnect the implement from the tractor, all that it is necessary to do is to engage the hooks 126 underneath their associated draft members 31, and then disconnect the bolt 54 and the two chains 79 and 94 from the slotted clips 78 and 95. The tractor may then be driven away from the implement, the latter remaining in upright position. Before disconnecting the implement both bottoms are lowered into contact with the ground. When it is desired to reconnect the implement to the tractor, the latter is backed into a position with the rear wheels straddling the two front ends of the plow beams 13 and with the plate-receiving socket member 40 in a position to receive the plate 35. Normally, the plate 35 will be retained in a position adapted to enter the socket member by virtue of frictional contact between the loops 33, 34, 36 with the two draft members 31. When the tractor is in the proper position, it is backed or rolled into a position to cause the plate 35 to enter the socket member 40. This brings the opening in the rear end of the hitch plate extension 52 in registry with the opening in the rear end of the laterally swingable draft bar 56. It is then a simple matter to insert the hitch bolt 54. All that now remains to be done is to hook the upper ends of the chains 79 and 94 into the clips carried by the adjusting levers 74 and the lifting arms 92. The implement is now fully connected with the tractor and ready for operation. For the opening-up round, the operator will suitably adjust the operating plow for level position by turning the adjusting crank screw 106, and then after the first round has been plowed, the rear wheel of the tractor will then run in the previously opened furrow, and it is necessary for the farmer to readjust or re-level the plow by turning the crank screw 106. This leveling adjustment is then retained until some change of depth is made. The depth of operation may be changed at any time by swinging the hand lever 74 in one direction or the other, which serves to raise or lower the front end of the plow beam 13. This determines the operating depth, further adjustment being possible, as may be necessary to adapt the implement to different tractors, by engaging different links in the slotted clips 78. Normally the position of the draft transmitting link 31 is such that it extends downwardly and forwardly from its point of connection with the intermediate portion of the associated plow beam. This downward pull materially facilitates getting the plow into the ground, but the downward reaction at the front end of the plow beam is transmitted to the tractor through the chain 79, which thus applies downward force to the tractor and increases the traction available. Either plow may be raised or lowered, as desired, by first operating the selecting valve to select either the right-hand or left-hand bottom, and then raising and lowering that bottom by operating the main valve lever 118. When the plow is raised the link 31 swings upwardly and forwardly. This brings the plow as a whole closer to the tractor so that the rearward overhang of the plow is reduced for transport.

A modified form of the present invention is illustrated in Figure 4. In this figure the tractor 130 is provided with a power lift 131 of the type which includes a transverse rockshaft 132. The tractor 130 also has a pair of drawbar support angles 134 and 135 converging forwardly and at forward ends carrying a pivot 137 swingable about a transverse axis and, in turn, carrying a vertical pivot 138 to which the forward end of the tractor drawbar 139 is swingably connected. For purposes of clarity, the major portions of the tractor have been indicated in dotted lines so as to afford a view of the parts underneath with which the present invention is more particularly concerned.

The implement shown in Figure 4 comprises a plow 140 similar in construction to the plows described above except that it is a one-way two-bottom implement. The plow 140 includes a frame structure 141 having two beams 142 and 143 suitably connected together by braces 144 and 145. The rear ends of the beams carry clamping plates 148 and 149 which serve as means securing depending standards 151 to the beams, and plow bottoms 152 are connected in any suitable way to the lower ends of the standards 151.

The rear end of the tractor drawbar 139 is apertured, as at 156 (Figure 5) to receive a bolt 157 which fastens through an aperture 158 in the drawbar attaching section 159 which is connected by a bracket 161, preferably by welding, to a horizontal hitch plate 163 similar, for all practical purposes, to the hitch plate 35 described above. The bracket 161 is notched, as at 164, to receive the drawbar 139, and the forward edge of the hitch plate 163 is curved, as at 165, so as to be disposed adjacent a pair of bushings 166 mounted on the drawbar angles 134 and 135 by bolts 168 and 169 which also secure an upper plate 171 in generally fixed relation to the tractor, the same as the upper plate 41 in Figure 1. The bushings 166 space the plate 171 a sufficient distance above the angles 134 and 135 to receive the hitch plate 163 therebetween, as best shown in Figure 5, and by virtue of the bolt 157 and the notch 164, the hitch plate 163 and associated parts are connected to the tractor drawbar 139 and held against lateral movement with respect thereto.

The rear edge of the hitch plate 163 is provided with a pair of clips 173, preferably welded thereto, and these clips receive the laterally turned forward end portion 174 of a generally L-shaped rigid draft member 175, the rear end of which is received in a sleeve 176 and can turn therein about a generally longitudinally extending axis. The sleeve 176 is fixed to a yoke 177, preferably by welding, and the latter has trunnions rockably mounted in a pair of bearing plates 178 and 179 fixed to the plow beams 142 and 143. The rear end of the draft member 175 is apertured to receive a bolt 181 by which a collar 182 is fixed to the rear end of the draft member 175, whereby the forward draft may be applied to the plow. The member 175 thus forms a principal draft transmitting element between the plow and the tractor.

The beam 142 is extended forwardly, as at 192, and passes underneath the rear axle of the tractor. Fixed to the front side of the rear axle is an angle bracket 201 to which a sector 202 is fixed. A hand lever 203 is pivoted, as at 204, to the sector and includes a forward extension 205 which carries a hook member 206 which receives the upper end of a chain 207, the lower end of which is connected by a clevis or the like to the front end portion 192 of the beam 142. Similarly, the front end portion 211 of an extension beam 212, the forward end of which extends underneath the left part of the tractor axle, carries the same adjusting lever arrangement just described and hence is indicated by the same reference numerals. The right hand lever 203 is primarily a depth adjusting lever while the left hand lever 203 is primarily a leveling lever. The plow shown in Figure 4 is raised and lowered into and out of a transport position by arms and links or chains connected between the power lift shaft 132 and the plow beams 142 and 143, respectively. This lifting structure is substantially the same in principle as the lifting structure described above and in connection with Figures 1 and 2.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. For use with a tractor having a rearwardly extending drawbar pivotally connected at its front end with the tractor for lateral swinging movement about a vertical axis and a drawbar support receiving said laterally swingable drawbar: the improvement comprising a quick detachable connection including means serving as a socket adapted to be mounted in fixed relation on the drawbar support forward of the rear end of said laterally swingable drawbar and including an open rear portion, and an implement unit carrying adjacent its forward portion an attaching member comprising a rear part, means for attaching said rear part to the rear end of the tractor drawbar, and a forward portion adapted to be received in said socket means, as by backing the tractor up to the implement unit, said forward portion and said socket having interengaging surfaces lying, when engaged, in arcuate relation with respect to the axis of swinging of the tractor drawbar, whereby said forward portion is swingable laterally in said socket means as the implement unit moves with the tractor drawbar about said vertical axis.

2. In a tractor mounted implement, a quick detachable connection between the tractor and the implement comprising a plate hingedly connected with the forward portion of the implement, a pair of interconnected vertically spaced parts adapted to be carried by the tractor, the spacing between said parts being such as to accommodate the disposition of said implement-carried plate therebetween, said plate being movable laterally between said guide parts, said tractor having a laterally swingable draft transmitting member, and means detachably connecting the forward portion of said implement with the rear portion of said laterally swingable tractor-carried member.

3. A hitch construction for tractor mounted implements and the like, comprising means forming a rearwardly facing plate-receiving socket adapted to be carried by the tractor, a laterally swingable drawbar member adapted to be pivotally connected with the tractor for movement about a vertical axis forward of said socket, and an attaching plate member adapted to be connected with the forward portion of the implement and having a forward portion adapted to be received in and guided laterally by said socket and a rear section adapted to be connected in draft transmitting relation to the rear end of said laterally swingable drawbar.

4. The invention set forth in claim 3, further characterized by said socket comprising a pair of vertically spaced apart plate sections and laterally spaced bushings disposed between said sections, said implement-carried plate having a forward arcuate section adapted to shift about said vertical axis and substantially in contact with said bushings.

5. The invention set forth in claim 3, further characterized by flange means having a downwardly facing notch and carried by said plate for receiving said drawbar.

6. A hitch construction for connecting an implement to a tractor comprising a drawbar connected with the tractor for lateral swinging about a generally vertical axis, socket means carried by the tractor and including upper and lower spaced apart plate sections adapted to receive an attaching plate therebetween, an attaching plate adapted to be connected to an implement, means carried by said attaching plate and adapted to be connected to the rear end of said drawbar, and means for connecting the rear portion of said plate-carried means to the rear end of said tractor drawbar.

7. A hitch construction for connecting an implement to a tractor having a rearwardly facing socket and a laterally swingable drawbar, said hitch construction comprising a plate adapted to be connected to the implement and to be received by said socket, and means carried by said plate and adapted to be connected in draft transmitting relation to the rear end of said tractor drawbar.

8. A hitch construction for connecting an implement to a tractor having a rearwardly facing socket and a laterally swingable drawbar, said hitch construction comprising a plate adapted to be connected to the implement and to be received by said socket, a notched part carried by said plate for detachably receiving the tractor drawbar forward of the rear end thereof, a rear extension carried by said plate and adapted to lie alongside the rear portion of said tractor drawbar, and means for hitching the rear end of said extension to the rear end of said tractor drawbar.

9. In a tractor mounted implement, a quick detachable connection between the implement and the tractor comprising a socket member mounted on one of said tractor and implement, a socket-entering member mounted on the other of said tractor and implement, means fixed to the member on the implement and adapted to be pivotally connected with the tractor to swing about a generally vertical axis, and mutually engageable surfaces on said socket and socket-entering members, said surface on said implement mounted member being arcuate about said vertical axis whereby said implement may freely pivot laterally with respect to said tractor about said axis.

10. In a tractor mounted implement, a quick detachable connection between the tractor and the implement comprising a socket member mounted on the rear portion of said tractor, a socket-entering member carried by said implement on its forward portion, a curved surface on said socket-entering member, abutting means on said socket member whereby when said members are connected together the implement may swing laterally about said tractor with said surface and said abutting means always in contact, and means connecting said socket-entering member with the tractor for lateral swinging movement relative thereto about an axis which forms the center of said curved surface.

11. In a tractor mounted implement, a quick detachable connection between the tractor and the implement comprising a socket member rigidly mounted on said tractor, a vertically swingable socket-entering member carried by said implement, a laterally swingable drawbar connected with said tractor, and a part on said socket-entering member engageable with said drawbar whereby said drawbar and said socket-entering member may swing together about a common vertical axis, said socket-entering member being constantly slidably engaged with said rigid socket member.

12. In a tractor mounted implement, a hitch connection between the implement and the tractor comprising a receiving member mounted on said tractor, a hinged member on said implement, a swingable drawbar on said tractor pivoted about a vertical axis forward of said receiving member, an arcuate surface on said hinged member adapted to slidably abut against said receiving member, said surface arcuate about said vertical axis, and quick detachable means connecting said hinged member with said drawbar whereby said implement may swing laterally about said vertical axis.

13. In a tractor mounted implement, a quick detachable connection between the tractor and the implement comprising an arcuate part connected with the forward portion of the implement, a pair of interconnected vertically spaced parts adapted to be carried by the tractor, the spacing between said parts being such as to accommodate the disposition of said arcuate part therebetween, said arcuate part being movable laterally between said guide parts, said tractor having a laterally swingable draft transmitting member movable about a generally vertical axis, said arcuate part being arcuate about said axis when mounted in place between said guide parts, and means detachably connecting said arcuate part with said laterally swingable tractor-carried part.

14. A hitch construction for connecting an implement to a tractor having a laterally swingable drawbar and a rearwardly facing socket mounted on the tractor so as to be rigid with respect to movement relative thereto about a generally fore and aft extending axis, said hitch construction comprising a plate adapted to be connected to the implement and to be received by said socket, means connecting the plate with the implement and said socket so as to be rigid with respect to movement relative thereto about a generally fore and aft extending axis, and means for connecting said implement with said laterally swingable drawbar so as to swing laterally therewith while held by said socket and plate against movement relative to the tractor about said fore and aft extending axis.

15. The invention set forth in claim 14, further characterized by means connecting the implement with the tractor drawbar so as to swing bodily therewith about the axis of swinging of the drawbar on the tractor.

16. For use with a tractor having a drawbar support and a laterally swingable drawbar pivoted at its forward end thereto: the improvement which includes an agricultural implement comprising means adapted to be mounted on said drawbar support in spaced relation, a plate member disposable between said means and said drawbar support, means on said plate member for connecting the latter to the rear portion of said drawbar, a pair of ground working tools, and draft transmitting means connecting said tools with said plate member.

17. An agricultural implement adapted to be connected to a tractor having a generally rearwardly facing socket member, said implement comprising ground working tool means, a draft member connected at its rear end with said tool means and at its forward end including a transverse portion, and a hitch plate pivoted to said transverse portion and adapted to enter said rearwardly facing socket member on the tractor.

18. A hitch device for connecting an agricultural implement to a tractor having a laterally swingable drawbar pivotally connected at its front end to the tractor, said hitch device comprising means adapted to be connected to the tractor adjacent said laterally swingable drawbar and forming a rearwardly facing socket member, a hitch plate pivoted to the forward portion of said implement and adapted to enter said rearwardly facing socket member, and means on said hitch plate for connecting the latter to the rear portion of said laterally swingable tractor drawbar.

19. A hitch device for connecting an agricultural implement to a tractor having a laterally swingable drawbar pivotally connected at its front end to the tractor, said hitch device comprising means adapted to be connected to the tractor adjacent said laterally swingable drawbar and forming a rearwardly facing socket member, a hitch plate pivoted to the forward portion of said implement and adapted to enter said rearwardly facing socket member, a rearwardly extending bar fixed at its forward end to the rear portion of said hitch plate, and means for connecting the rear end of said bar to the rear portion of said laterally swingable tractor drawbar.

WALTER H. SILVER.
ROBERT E. COX.

REFERENCES CITED

The following references are of record in the file of this patent:

UNITED STATES PATENTS

| Number | Name | Date |
| --- | --- | --- |
| 1,556,508 | Hentzell et al. | Oct. 6, 1925 |
| 2,153,309 | Milz et al. | Apr. 4, 1939 |
| 2,401,183 | Pool et al. | May 28, 1946 |

FOREIGN PATENTS

| Number | Country | Date |
| --- | --- | --- |
| 436,704 | Germany | Dec. 2, 1925 |
| 648,624 | Germany | Apr. 12, 1936 |